United States Patent
Sutardja et al.

(10) Patent No.: US 7,696,732 B2
(45) Date of Patent: Apr. 13, 2010

(54) DYNAMIC MULTIPHASE OPERATION

(75) Inventors: Sehat Sutardja, Los Altos Hills, CA (US); Runsheng He, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 12/355,877

(22) Filed: Jan. 19, 2009

(65) Prior Publication Data

US 2009/0174374 A1 Jul. 9, 2009

Related U.S. Application Data (63) Continuation of application No. 11/895,673, filed on Aug. 27, 2007, now Pat. No. 7,479,766, which is a continuation of application No. 10/657,672, filed on Sep. 4, 2003, now Pat. No. 7,265,522.

(51) Int. Cl.
*G05F 1/652* (2006.01)
*G05F 1/656* (2006.01)
(52) U.S. Cl. .................. 323/222; 323/282; 323/284
(58) Field of Classification Search ................ 323/222, 323/282, 283, 284
See application file for complete search history.

(56) References Cited

U.S. PATENT DOCUMENTS

| | | | |
|---|---|---|---|
| 5,852,557 A | 12/1998 | Woodward | |
| 6,016,258 A | 1/2000 | Jain et al. | |
| 6,034,514 A | 3/2000 | Sakai | |
| 6,052,790 A | 4/2000 | Brown | |
| 6,137,274 A | 10/2000 | Rajagopalan | |
| 6,144,194 A | 11/2000 | Varga | |
| 6,177,787 B1 | 1/2001 | Hobrecht | |
| 6,215,290 B1 | 4/2001 | Yang et al. | |
| 6,232,754 B1 | 5/2001 | Liebler et al. | |
| 6,278,263 B1 | 8/2001 | Walters | |
| 6,281,666 B1 | 8/2001 | Tressler et al. | |
| 6,285,568 B1 | 9/2001 | Taurand | |

(Continued)

FOREIGN PATENT DOCUMENTS

WO  WO 03/001656 A1  1/2003

OTHER PUBLICATIONS

Ashok Bindra, XP000928230, "New-Generation Power Controllers Take Multiphase Route Bi-Phase Synchronous PWM Controllers Come With On-Chip MOSFET Drivers To Simplify Multiphase Power Supply Design", Electronic Design, Penton Publishing, Cleveland, OH US, vol. 47, No. 22, Oct. 28, 1999.

(Continued)

*Primary Examiner*—Bao Q Vu (57) ABSTRACT

An output regulator includes a plurality of switch arrays. A controller enables selected ones of the plurality of switch arrays in response to a sense signal. The sense signal is based on an output of the output regulator. The controller generates drive signals to control the selected ones of the plurality of switch arrays. The controller adjusts first selected pulses in an output phase of the selected ones of the plurality of switch arrays based on a first pulse width. The controller adjusts second selected pulses in the output phase of the selected ones of the plurality of switch arrays based on a second pulse width greater than or less than the first pulse width.

18 Claims, 5 Drawing Sheets

U.S. PATENT DOCUMENTS

| | | |
|---|---|---|
| 6,356,462 B1 | 3/2002 | Jang et al. |
| 6,362,608 B1 | 3/2002 | Ashburn et al. |
| 6,404,175 B1 | 6/2002 | Yang et al. |
| 6,433,527 B1 | 8/2002 | Izadinia et al. |
| 6,459,602 B1 | 10/2002 | Lipcsei |
| 6,462,521 B1 | 10/2002 | Yang et al. |
| 6,462,525 B1 | 10/2002 | Chen |
| 6,534,960 B1 | 3/2003 | Wells et al. |
| 6,590,369 B2 | 7/2003 | Burstein et al. |
| 6,628,106 B1 | 9/2003 | Batarseh et al. |
| 6,683,441 B2 | 1/2004 | Schiff et al. |
| 6,703,812 B1 | 3/2004 | Lethellier |
| 6,791,304 B2 | 9/2004 | Pearce et al. |
| 6,873,140 B2 | 3/2005 | Saggini et al. |
| 7,265,522 B2 | 9/2007 | Sutardja et al. |

OTHER PUBLICATIONS

European Search Report for European Application No. EP04011779; 3 pages.

J.S. Batchvarov, J.L Duarte, M.A.M. Hendrix; XP000987789, "Interleaved Converters Based on Hysteresis Current Control", Electromechanics and Power Electronics Group, 2000 IEEE, pp. 655-661.

Official Communication from the European Patent Office dated Nov. 7, 2005 for Application No. 04 011 779.8-2207; 8 pages.

Official Communication from the European Patent Office dated Apr. 26, 2007 for Application No. 04 011 779.8-2207; 5 pages.

DYNAMIC MULTIPHASE OPERATION

CROSS-REFERENCE TO RELATED APPLICATIONS

This application is a continuation of U.S. patent application Ser. No. 11/895,673, filed Aug. 27, 2007 now U.S. Pat. No. 7,479,766, which is a continuation of U.S. patent application Ser. No. 10/657,672 filed Sep. 4, 2003 now U.S. Pat. No. 7,265,522. The disclosures of the above applications are incorporated herein by reference.

TECHNICAL FIELD

This invention relates to output regulators.

BACKGROUND

Output regulators are employed in numerous machines and devices including virtually every electronic device. An output regulator typically converts unregulated input power to one or more regulated outputs for supplying power to circuits within the machine or device. The regulated outputs are most commonly regulated voltage, but regulated current and regulated power may also be generated. The output regulator may be integrated into the machine or device, or the output regulator may be a separate assembly that is assembled to machine or device. Several characteristics of output regulators may be used to judge the quality of a particular design including operating characteristics such as power density, efficiency, output regulation, and transient response. Improvements in the operating characteristics of output regulators are desirable so that machines and devices that use output regulators may be improved such as by being made smaller, requiring less power, having improved accuracy and reliability, or having improved operation during transient conditions.

SUMMARY

In one aspect, a control system for controlling a multiphase output regulator having a regulated DC output and operating at a switching frequency. The multiphase output regulator including at least two switch arrays to generate individually controllable output phases that combine to form the regulated DC output. The control system comprising a digital controller operable at a sampling frequency greater than the switching frequency. The digital controller responsive to a sense signal corresponding to the regulated output, to generate array duty cycle signals to control each of the switch arrays. The digital controller to control the array duty cycle signals at the sampling frequency and to dynamically set a phase interval between each of the output phases.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
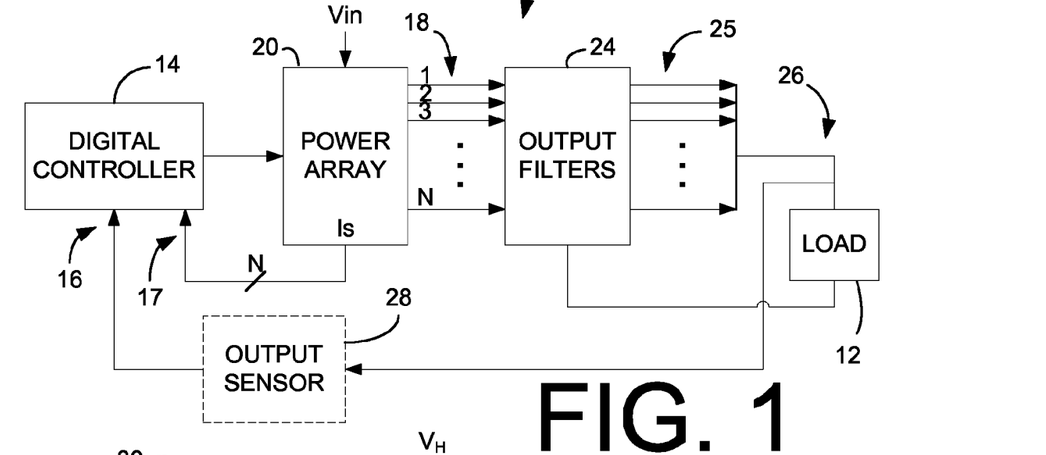
FIG. 1 is a block diagram of an aspect of a multiphase output regulator.

FIG. 1 shows a multiphase output regulator 10 for supplying regulated power to a load 12. Although, the multiphase output regulator 10 is described as having a buck topology, any type of topology may be used such as boost, flyback (buck-boost), Cuk, Sepic, and Zeta. The multiphase output regulator 10 may include a power array 20 to convert an unregulated DC voltage, such as Vin, to multiple output phases 18 that have a dynamically controlled phase relationship. Each of the output phases 18 may include a variable pulse width power signal that may be skewed in time, relative to the other output phases by a phase interval. In addition, the quantity of active output phases may be dynamically controlled. For example, the power array 20 may generate up to "N" different output phases such as 8 output phases 18. During one operating condition, 4 output phases may be active and spaced at 90 degree time intervals. Then, while the multiphase output regulator 10 operates, another of the output phases 18 may be activated and the 5 active output phases be dynamically controlled to be spaced at 72 degree time intervals.

The power array 20 may generate current sense signals, Is, corresponding to each of the output phases 18. Multiple output filters 24 corresponding to the output phases 18 may filter the output phases 18 to generate filtered outputs 25 that may be combined to form a regulated output 26. Each of the output filters 24 may include an output inductor and an output capacitor. By skewing two or more of the output phases 18, the ripple voltage of the regulated output may be reduced, and the ripple frequency may be increased leading to a reduction in the size of the output filters. The regulated output 26 is preferably a DC voltage output and may be any output characteristic including voltage, current, and power. The unregulated voltage, Vin, may be any form of input power such as alternating current (AC) voltage and DC voltage. For an AC input voltage a rectification stage (not shown) may be included to convert the AC voltage to the DC input voltage, Vin. An output sensor 28 may sense the regulated output 26 and send a feedback signal 16 to a digital controller 14. Any type of output sensor 28 may be employed to sense the output. The digital controller 14 may, in response to receiving input signals such as the feedback signal 16, generate one or more control signals to drive the power array 20. Other input signals may include the current sense signals Is from the power array 20. The control signals in the digital controller 14 may include a duty cycle signal, a phase interval signal, and an inertializer signal. The duty cycle signal may control the operating frequency, variable frequency versus fixed frequency operation, the number of output phases generated and the duty cycle generated by the active output phases 18. The phase interval signal may control the phase angle of each of the output phases 18. The inertializer signal may control turn-on of the power array 80 to increase the current flowing through the output inductor to the steady-state level to reduce transients in the regulated output during turn-on. The digital controller 14 may generate drive signals based on the control signals to drive the power array 20. The digital controller 14 may operate at a sampling frequency greater than the switching frequency of the multiphase output regulator. The digital controller 14 may operate at a sampling frequency that is greater than the switching frequency such as a factor of 32, although the frequency of the sampling frequency is non-limiting. The digital controller 14 may be implemented in any programmable digital device such as a real time digital signal processor.

Figure 2:
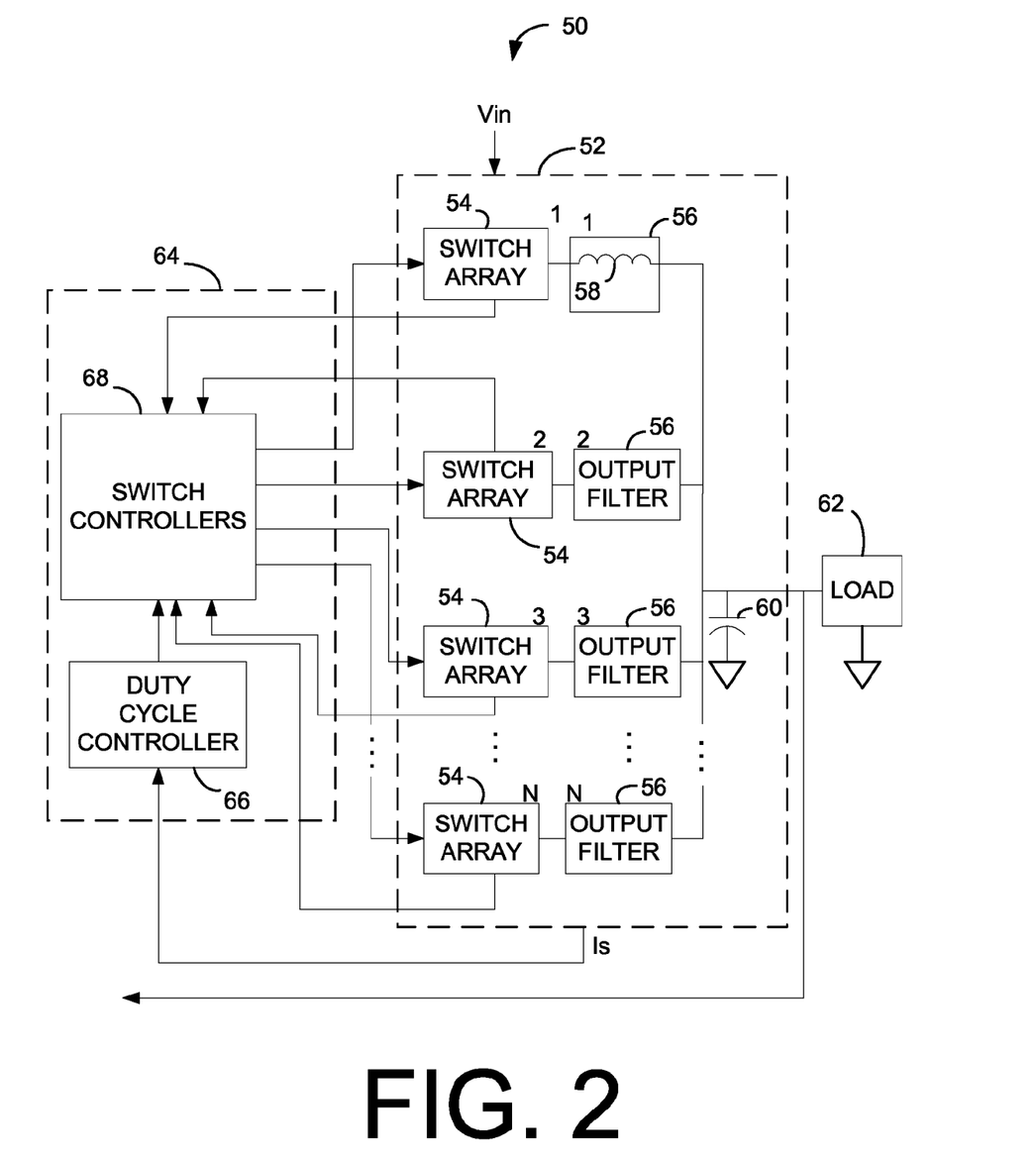
FIG. 2 is a block diagram of an aspect of a multiphase output regulator.

FIG. 2 shows an aspect of a multiphase output regulator 50 for supplying power to a load 62. The multiphase output regulator 50 may include a power array 52 having from two to "N" switch arrays 54 for generating phased outputs from a DC input voltage. Each of the switch arrays 54 may receive one or more control signals to control the operating characteristics of the switch arrays 54 such as duty cycle, operating frequency, enable/disable, and start-up operation.

Figure 3:
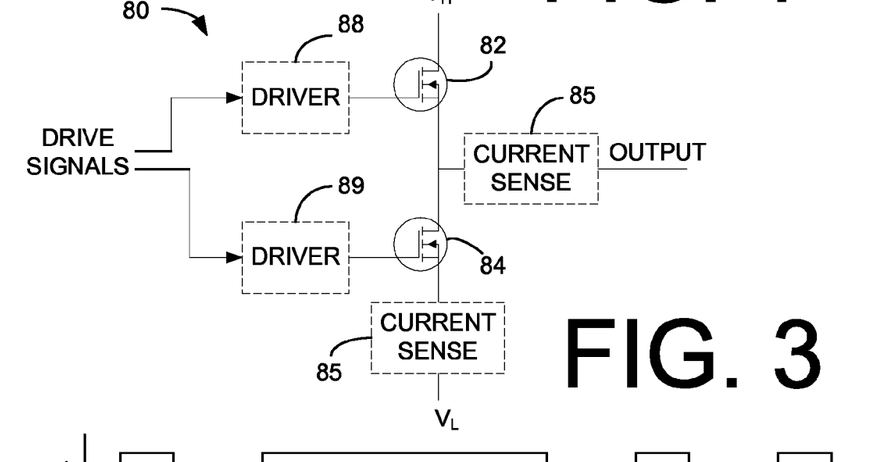
FIG. 3 is a block diagram of an aspect of a switch assembly.

FIG. 3 shows an aspect of a switch array 80. The switch array 80 may generate a pulse width modulated output in response to one or more drive signals. A pair of power switches 82 and 84 may be connected in a half-bridge configuration between two voltage sources. The power switches 82 and 84 may be driven by the drive signals to operate in a switching mode to generate the pulse width modulated output. Any type of power switch may be used such as MOSFETs, BJTs, MCTs, IGBTs, and RF FETs. Each of the power switches 82 and 84 may comprise one or more parallel power switches.

Drivers 88 and 89 may buffer the drive signals from the digital controller 14 to the power switches 82 and 84. Any type of driver may be used.

A current sense circuit 85 may sense current flowing to the output or through the power switches 82 and 84. Any type of current sense circuit 85 may be used such as resistive, transformer-resistor, Hall effect, and sensing voltage across the channel of a FET device.

The power array 52 may include output filters 56 corresponding to each of the switch arrays 54. The output filters 56 filter the phase outputs of the switch arrays to generate the regulated output. Each output filter 56 may include an output inductor 58. A single output capacitor 60 is preferably connected to the combined output of the output filters 56. However, the output capacitors 60 may be distributed so that each output filter 56 includes an output capacitor 60.

A digital controller 64 may generate the control signals to control the flow of power through the power array 52 to the load 62. The digital controller 64 may include a duty cycle controller 66 to determine, as a function of a feedback signal from the load 62, a regulator duty cycle to maintain the regulated output in regulation. The feedback signal may sample any output characteristic such as voltage, current, and power. The duty cycle controller 66 may also control the duty cycle as a function of the current, Is, flowing through the output inductor 58 or the power switches 82 and 84. The duty cycle controller 66 may implement either voltage mode control or current mode control. Also, the duty cycle controller 66 may implement fixed frequency or variable frequency operation. The duty cycle controller 66 may sample the feedback signal and Is at a sampling frequency greater than the switching frequency of the multiphase output regulator 50.

Switch controllers 68 may determine and control the power array operating characteristics such as the quantity of phases to generate the duty cycle for each of the activated switch arrays 54, and a phase interval between each of the activated output phases 54, where the phase interval is the time offset between the leading edges or the trailing edges of the pulses for each of the output phases 54 that are active. Under steady-state operating conditions the phase interval as measured between the leading edges of the pulses or measured between the trailing edges of the pulses is approximately equal. There may be a one to one correspondence between the switch controllers 68 and the switch arrays 54. However, the scope of the invention includes controlling either all or a subset of the switch arrays 54 with a single switch controller 68. The drive signals for each of the switch arrays 54 may be set as a function of the duty cycle signal from the duty cycle controller 66. Some of the other power array operating characteristics that the switch controllers 68 may determine and control include the quantity of switch arrays 54 to enable, and the switching frequency of the multiphase output regulator 50, where the switching frequency is the frequency of the individual output phases 54. The switch controllers 68 may determine the power array operating characteristics based on any regulator criteria such as output current, power switch current for any of the switch arrays, output inductor current, output voltage, output ripple voltage, input voltage, noise generation, and power consumption in discrete components, circuits, or the entire output regulator.

Figure 4A:
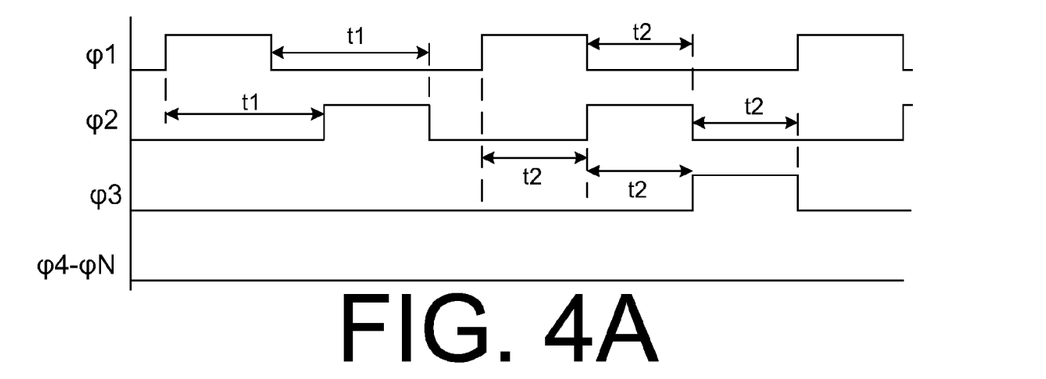
FIG. 4A is a graph of phase waveforms corresponding to aspect of a multiphase output regulator.

FIG. 4A shows waveforms of three of the N output phases 54 for an aspect of changing from 2 phase operation to 3 phase operation. The remaining output phases, $\phi 4$ to $\phi N$ remain inactive. The array controller 68 may enable phases $\phi 1$ and $\phi 2$ of the output phases 54 to each operate at a duty cycle of 33.3% with a phase interval of t1. The multiphase output regulator 50 may operate with only phases $\phi 1$ and $\phi 2$ active for any period of time. Then, the array controller 68 may enable phase $\phi 3$ of the output phases 54 and set each of the output phases, $\phi 1$, $\phi 2$, and $\phi 3$ to a duty cycle of 33.3% with a phase interval of t2. The array controller 68 dynamically changes the phase interval of the output phases 54 to adjust for increasing the number of active output phases 54 from 2 to 3.

The array controller 68 may also control the current flowing through individual ones of the output inductors 58. In one aspect, when enabling one or more additional phase outputs, the array controller 68 may control the corresponding switch array 54 to ramp up the current flowing through the corresponding output inductor 58 to minimize the transient response time as the currents flowing through the output inductors 58 of the active output filters 56 settle out to steady-state levels.

Figure 4B:
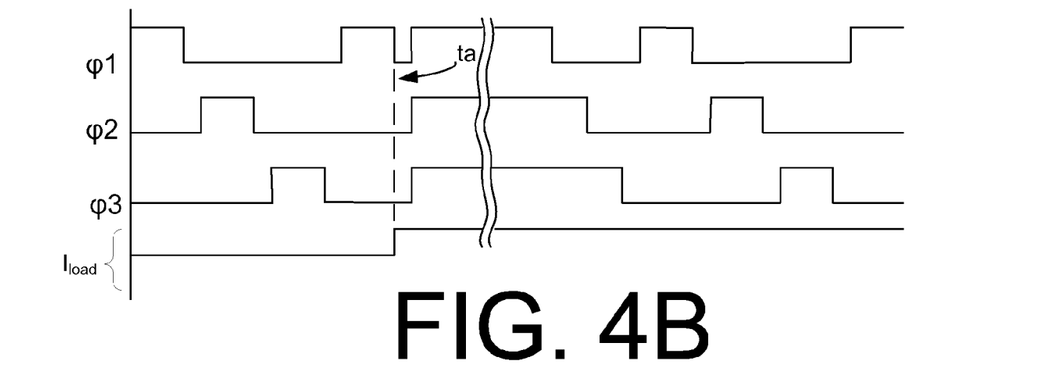
FIG. 4B is a graph of phase waveforms corresponding to aspect of a multiphase output regulator.

FIG. 4B shows waveforms of the operation of an aspect of the multiphase output regulator 50 during an output load change. At time ta the output load, $I_{load}$, increases, and the array controller 68 may set all or a subset of the output phases to 100% duty cycle to cause the output current to quickly increase, reducing transient changes in the output voltage. After a period of time, the array controller 68 may dynamically reintroduce the phase relationships between each of the output phases. For example, the array controller may control the leading edges of the drive signals to dynamically set the phase interval between each of the output phases. The trailing edges of the drive signals are then controlled to maintain the regulated output within the regulation limits. In another exemplary system, the array controller 68 may control the trailing to set the phase interval, and control the leading edges to maintain the regulated output in regulation. The array controller 68 may operate similarly when the output load, $I_{load}$, decreases (not shown). Here, the array controller may set all or a subset of the output phases to 0% duty cycle to cause the output current to quickly decrease, reducing transient changes in the output voltage.

Figure 4C:
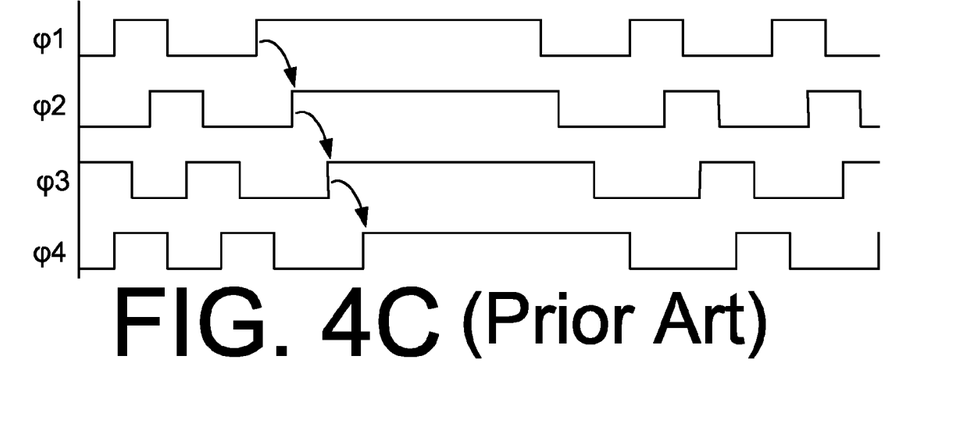
FIG. 4C is a graph of phase waveforms for a conventional multiphase output regulator.

FIG. 4C shows waveforms of the operation of a conventional multiphase output regulator having four output phases. Conventional multiphase output regulators generally control only the trailing edge of the drive signals. The trailing edge is controlled to maintain the regulated output in regulation. The leading edges of the drive signals for each of the output phases are generally fixed in relation to each other. As the total quantity of output phases is changed, the phase relationship between the phases remains static. For example, in a conventional multiphase output regulator having four output phases, the output phases may be spaced apart by 90 degrees so that the leading edges occur at 0 degrees, 90 degrees, 180 degrees, and 270 degrees. When one of the output phases is disabled, the remaining output phases do not shift relative to each other so that the leading edges may occur at 0 degrees, 90 degrees, and 180 degrees. In addition, during a load change, the length of the conduction time for each of the pulses may be lengthened, but the time relationship between the leading edges is typically maintained static and the time relationship between the trailing edges is also typically maintained static.

In contradistinction, the phase interval of the multiphase output regulator 50 may be adjusted dynamically by controlling the leading or trailing edges of the drive signals. For example, when the quantity of output phases is changed, the phase interval between each of the output phases may be dynamically changed such as shifting the leading edges from 0 degrees, 90 degrees, 180 degrees, and 270 degrees, to 0 degrees, 120 degrees, and 240 degrees when one of four output phases is disabled.

Figure 4D:
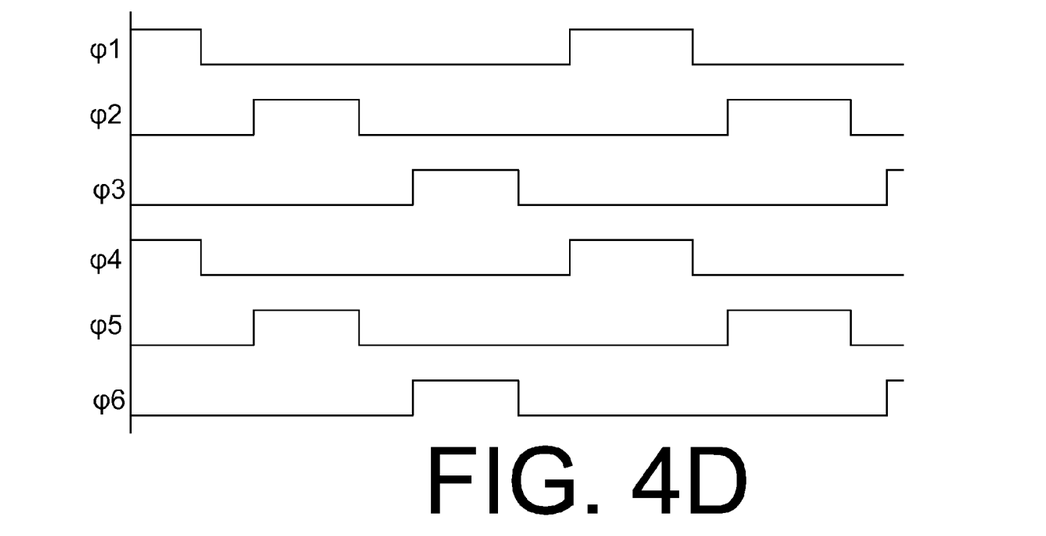
FIG. 4D is a graph of phase waveforms corresponding to aspect of a multiphase output regulator.

FIG. 4D shows another aspect of the multiphase output regulator 50. The array controller 68 may set multiple switch arrays to the same phase such as setting the output phase pairs φ1-φ4, φ2-φ5, and φ3-φ6 to approximately the same duty cycle. The array controller 68 may also apply dithering to the active output phases. The array controller 68 may generate a minimum increment resolution of the duty cycle that is equal to "x1", and by applying dithering to an output phase or a complementary output phase, the average of the generated pulse may be stretched by any fractional portion of "x1". In one dithering method, a selected number of pulses within an output phase may be stretched by an integer "N" number of increments, and the remaining pulses within the output phase may be stretched by an integer "N−1" or "N+1" number of increments to generate a pulse that is fractionally stretched.

Figure 5:
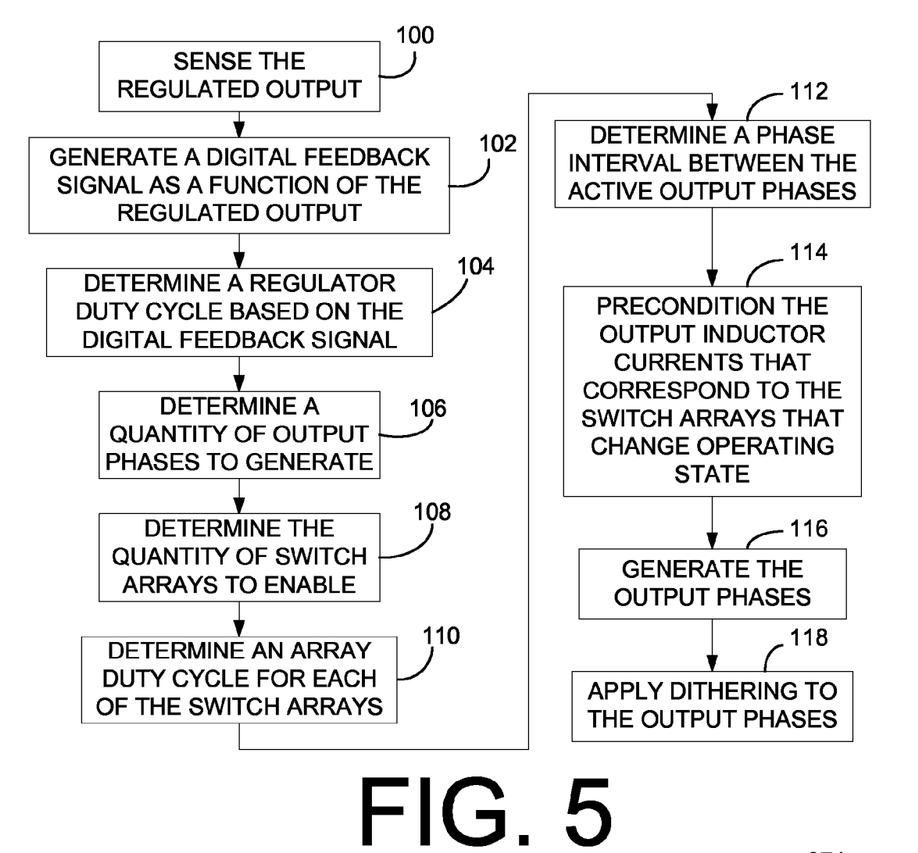
FIG. 5 is a flow diagram of an operation for controlling a multiphase output regulator.

FIG. 5 shows an aspect of the operation of a multiphase output regulator. At step 100, sense a regulated output of the multiphase output regulator. At step 102, generate a digital feedback signal as a function of the regulated output. At step 104, determine a duty cycle at which to convert power from an input source to the regulated output. Continuing to step 106, determine a quantity of output phases to generate. At step 108, determine a quantity of switch arrays to enable. One or more switch arrays may be used to generate each of the output phases. For example, two switch arrays may be used for each of four output phases leading to a total of eight switch arrays. Continuing to step 110, determine an array duty cycle for each of the switch arrays based on the regulator duty cycle. At step 112, determine a phase interval to separate the pulses of each of the output phases. The phase interval may be referenced to any portion of the output phase waveform such as the leading and trailing edges of the pulse. At step 114, precondition the output inductor currents that correspond to the switch arrays that change operating state from either active to inactive, or from inactive to active. At step 118, apply dithering to the active output phases.

Figure 6:
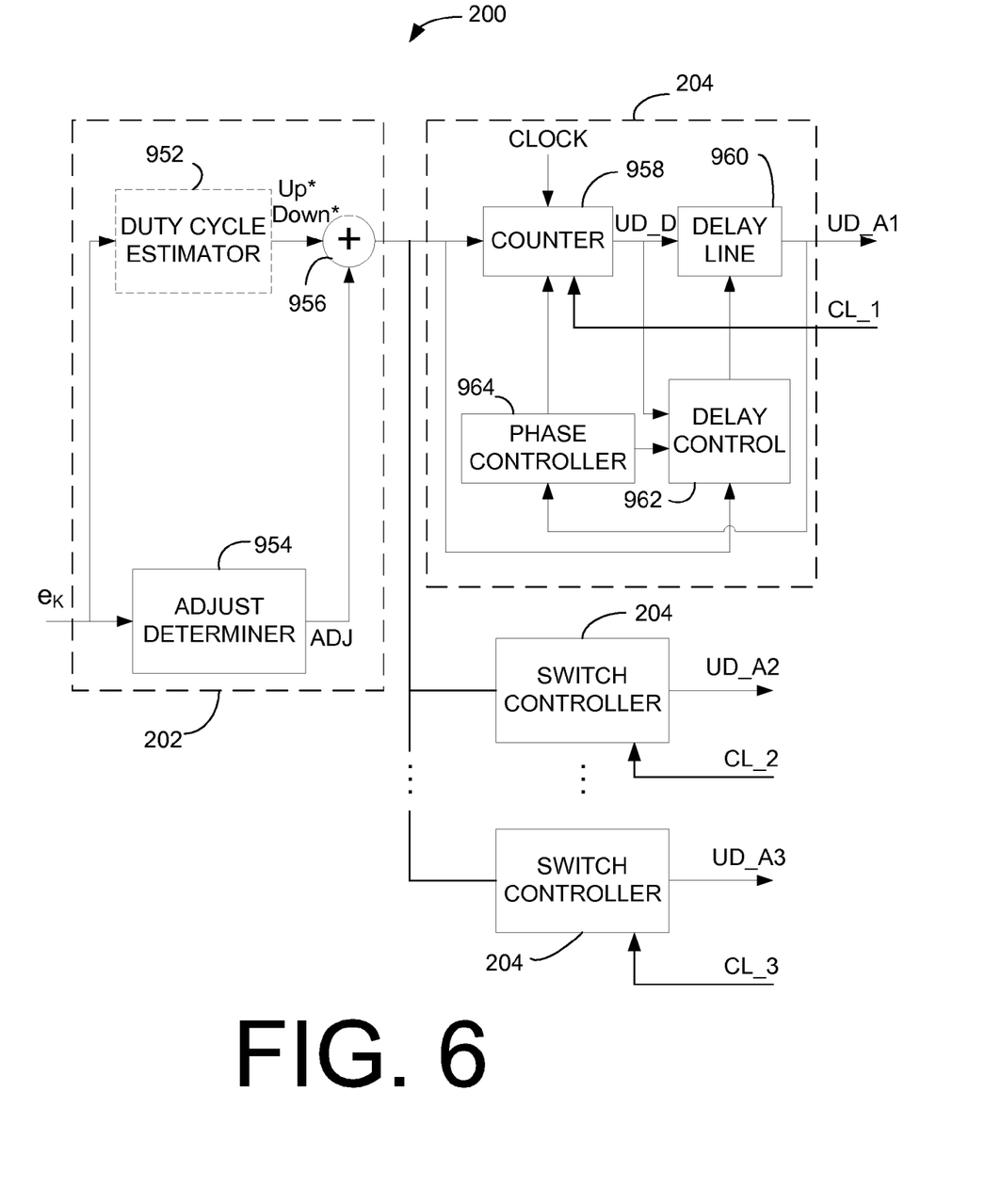
FIG. 6 is a block diagram of a digital controller for generating a duty cycle signal.

FIG. 6 shows an aspect of a digital controller 200. The digital controller 200 may include a duty cycle controller 202 to determine a duty cycle for operating the switch arrays 54. The duty cycle controller 202 may include a duty cycle estimator 952 to generate nominal duty cycle signals and an adjust determiner 954 to determine an adjustment value, ADJ, to combine with the nominal duty cycle signals.

The duty cycle estimator 952 may generate nominal duty cycle signals, Up* and Down*, that correspond to nominal steady-state values from which to generate a current duty cycle for the switching regulator. The duty cycle estimator 952 may be used for generating nominal duty signals in operating states such as PWM, variable frequency, quasi-resonant mode, and energy saving discontinuous mode. However during a hysteretic control operating state, the duty cycle estimator 952 is preferably not used for computing the nominal duty cycle. Instead during hysteretic control, the duty cycle may be directly related to the error signal so that when the error signal is in one state the duty cycle is set to the ON state (up), and when the error signal is in the other state the duty cycle is set to the OFF state (down). The duty cycle estimator 952 may generate the nominal duty cycle signals as a function of input signals such as an error signal, a UD pulse, and a delay control. The error signal may represent the error between the regulated output and a reference. Power switches in the switching regulator may be operated at the current duty cycle to control the conversion of energy from an input source, Vin, to the load 212. For example, in a switching regulator having a buck topology and fixed frequency operation, the nominal duty cycle signal Up* may be approximately equal to a value that corresponds to the ratio of the output voltage to the input voltage. In another aspect, the nominal duty cycle may be determined by computing a running average of the duty cycle over a predetermined quantity of switching cycles. In another aspect, the nominal duty cycle may be determined by incrementing or decrementing the prior nominal duty cycle based on the amplitude of the error signal. During fixed frequency operation, the combination of the nominal steady-state values may correspond to the total switching period of the switching regulator such as 1 usec for a 1 MHz switching frequency.

Figure 7:
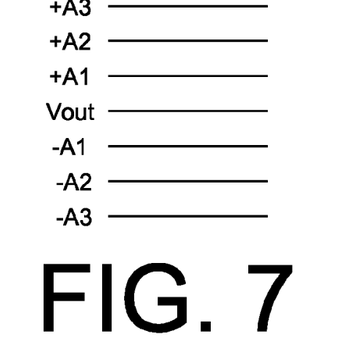
FIG. 7 is a graphical representation of voltage ranges spaced about a nominal output voltage, Vout.

The adjust determiner 954 may determine an adjustment value, ADJ, to combine with the nominal duty cycle signals to generate adjusted duty cycle signals, Up and Down. The adjust determiner 954 may generate the adjustment value as a function of the error signal as well as other signals from the switching regulator. The adjust determiner 954 may generally be used for any operating state except hysteretic control. Since in the hysteretic control operating state, the duty cycle is either 100% ON or 100% OFF, no adjustment value is required. In one aspect, the adjustment value for the PWM state and the energy saving discontinuous mode may be computed as follows:

$$ADJ_k = g(e_k) + h(\text{trend}_k)$$

$$Up_k = Up^* - ADJ_k * FAC^{on}$$

$$Down_k = Down^* + ADJ_k * FAC^{off}$$

where FAC may be determined based on the nominal duty cycle, $$g(e_k) = \begin{cases} 0 & \text{if } |e_k| < A1 \\ \text{sign}(e_k) * \Delta_1 & \text{if } A1 \leq |e_k| < A2 \\ \text{sign}(e_k) * \Delta_2 & \text{if } A2 \leq |e_k| < A3 \end{cases}$$

$$h(trend_k) = \begin{cases} 0 & \text{if } |trend_k| < 1 \\ trend_k & \text{if } |trend_k| \geq 1 \end{cases}$$

$$trend_k = F_{slope} * \overline{e_k - e_{k-n}}$$

where $F_{slope}$ is a constant, $\overline{e_k - e_{k-n}}$ is an average of the slope of the waveform where the slope is the error difference from the "n" prior cycles, where "n" is the number of samples in a switching period, and A1, A2, and A3 are defined in FIG. 7 which shows voltage levels of a voltage slicer for generating the error signal. The voltage levels may be selected to define voltage ranges that are approximately centered around a nominal voltage level for the output voltage, Vout.

$\Delta_1$ and $\Delta_2$ are loop gains which may be selected at the sampling rate and may have values based on the amplitude of the error signal. The values of the loop gains, $\Delta_1$ and $\Delta_2$, may be selected to be related such as $\Delta_2$ being approximately equal to two times $\Delta_1$. The loop gain of the digital controller may be changed adaptively at any rate up to and including the sampling rate. Each of the loop gains may be dynamically changed as a function of any parameter of the output regulator such as the voltage range of the error signal, the voltage range of the regulated output, and the duty cycle.

The loop compensation of the digital controller may be described by the ratio of $g(e_k)$ to $h(trend_k)$, which may be expressed generally as (A*e(k)/B*e'(k)). The loop compensation may be controlled at any rate up to and including the sampling frequency. In one aspect, the constant $F_{slope}$ may be adaptively changed to change the loop compensation. The loop compensation may be dynamically changed as a function of any parameter of the output regulator such as the voltage range of the error signal, the voltage range of the regulated output, and the duty cycle.

A combiner 956 may combine the nominal duty cycle signals with the adjustment value to generate the adjusted duty cycle signals. In one aspect, the adjusted duty cycle signals may be used as counter limits for generating a UD pulse.

One or more switch controllers 204 may receive the adjusted duty cycle signal and generate drive signals for controlling each of the switch arrays 54 of the power array 52. Each of the switch controllers 204 may control the power array operating characteristics such as the quantity of output phases to generate, the quantity of switch arrays 54 to generate each output phase, and a phase interval between each of the activated output phases 54, where the phase interval is the time offset between the leading edges of the pulses for each of the output phases 54 that are active. Each switch controller 204 may receive a current sense signal, CL_N, from a corresponding switch array 54, and control the drive signals as a function of the current sense signal.

Figure 8:
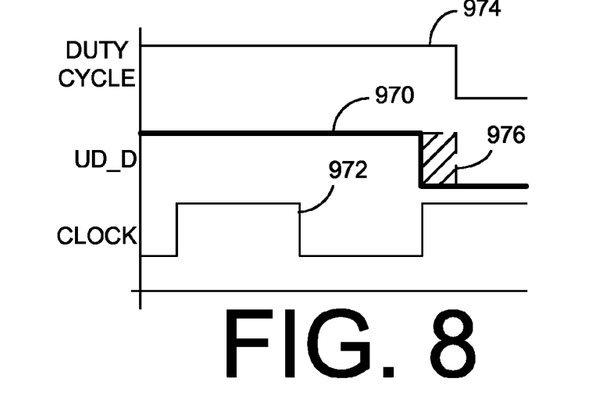
FIG. 8 is a timing diagram of waveforms showing quantization error associated with an aspect of a digital controller.

A counter 958 may generate the UD_D pulse as a function of a clock signal, CLOCK, and the adjusted duty cycle signals. The UD_D pulse preferably is a binary signal representing a varying on-time for driving the power switches of the switching regulator. The counter 958 may count a quantity of clock cycles set by the counter limits to generate the "on-time" and "off-time" of the UD_D signal. For example, the Up portion of the adjusted duty cycle signal may set the counter limit for the on-time and the Down portion of the adjusted duty cycle signal may set the counter limit for the off-time. Preferably, a single counter generates the UD_D signal in response to a single counter limit signal including both the Up and Down information. The UD_D pulse may include a quantization error related to the pulse resolution being limited by the frequency of the clock signal. FIG. 8 shows an example of quantization error in which a UD_D pulse 970 that is generated from a clock signal 972 and an adjusted duty cycle signal 974 may have a quantization error 976 related to the frequency of the clock signal.

A delay line 960 may generate drive signals, UD_A pulse, that finetune the pulse width of the UD_D pulse generated by the counter 958 to reduce the quantization error. The UD_A pulse preferably has an "on" level and an "off" level and may have a varying pulse width to represent an on-time for driving the power switches of the switch array 54. The delay line 960 may, in response to receiving the UD_D pulse and a delay control signal, generate the UD_A pulse having a duty cycle that approximates the pulse width corresponding to the adjusted duty cycle signals. The delay line 960 may delay either edge of the UD_D pulse to generate the UD_A pulse. For example, in one aspect the UD_D pulse may be generated having a pulse width shorter than the corresponding adjusted duty cycle, and then the delay line 960 may delay the trailing edge to generate the UD_A pulse. In another aspect, the UD_D pulse may be generated having a pulse width longer than the corresponding adjusted duty cycle, and then the delay line 960 may delay the leading edge to generate the UD_A pulse.

A delay control 962 may generate the delay control signal as a function of the UD_D pulse and the adjusted duty cycle signals. The delay control signal may preferably be a multi-bit signal.

A phase controller 964 may monitor the UD_A pulse and in response control the counter 958 and the delay control 962 to set the phase characteristics of the power array 52. The phase characteristics may include the quantity of output phases, the quantity of active switch arrays 54 per output phase, and the phase interval between output phases.

A number of embodiments of the invention have been described. Nevertheless, it will be understood that various modifications may be made without departing from the spirit and scope of the invention. Accordingly, other embodiments are within the scope of the following claims.

What is claimed is:

1. An output regulator comprising:
   a plurality of switch arrays; and
   a controller that:
   enables selected ones of the plurality of switch arrays in response to a sense signal, wherein the sense signal is based on an output of the output regulator,
   generates drive signals to control the selected ones of the plurality of switch arrays, and
   adjusting first selected pulses in an output phase of the selected ones of the plurality of switch arrays based on a first pulse width, and
   adjusts second selected pulses in the output phase of the selected ones of the plurality of switch arrays based on a second pulse width that is greater than or less than the first pulse width.

2. The output regulator of claim 1, further comprising an output sensor that generates the sense signal at a sampling frequency, wherein the controller selectively adjusts phase intervals between the selected ones of the plurality of switch arrays at the sampling frequency.

3. The output regulator of claim 1, wherein the controller includes:
a duty cycle controller that determines a duty cycle of the drive signals; and
a switch controller that generates the drive signals based on the duty cycle and phase intervals between the selected ones of the plurality of switch arrays.

4. The output regulator of claim 1, wherein the controller selects a number of the selected ones of the plurality of switch arrays based on output regulator criterion.

5. The output regulator of claim 4, wherein the output regulator criterion is selected from a group consisting of output current, power switch current for at least one of the plurality of switch arrays, output inductor current, output voltage, output ripple voltage, input voltage, noise generation, and power consumption.

6. The output regulator of claim 1, further comprising:
a plurality of output filters that communicate with outputs of corresponding ones of the plurality of switch arrays, wherein the controller controls the selected ones of the plurality of switch arrays during turn-on to initialize current flowing through corresponding ones of the plurality of output filters.

7. The output regulator of claim 2, wherein the output regulator operates at a switching frequency, and wherein the sampling frequency is greater than the switching frequency.

8. The output regulator of claim 1, wherein:
the drive signals include the first selected pulses and the second selected pulses;
the sampling frequency has a period; and
the controller dithers the drive signals to adjust at least one of the first pulse width and the second pulse width by portions of the period.

9. The output regulator of claim 8, wherein the controller adjusts the first pulse width by a first portion of the period and adjusts the second pulse width by a second portion of the period that is greater than or less than the first portion.

10. A method for operating an output regulator, the method comprising:
providing a plurality of switch arrays;
enabling selected ones of the plurality of switch arrays in response to a sense signal that is based on an output of the output regulator;
generating drive signals to control the selected ones of the plurality of switch arrays;
adjusting first selected pulses in an output phase of the selected ones of the plurality of switch arrays based on a first pulse width; and
adjusting second selected pulses in the output phase of the selected ones of the plurality of switch arrays based on a second pulse width that is greater than or less than the first pulse width.

11. The method of claim 10, further comprising:
generating the sense signal at a sampling frequency; and
selectively adjusting phase intervals between the selected ones of the plurality of switch arrays at the sampling frequency.

12. The method of claim 10, further comprising:
determining a duty cycle of the drive signals; and
generating the drive signals based on the duty cycle and phase intervals between the selected ones of the plurality of switch arrays.

13. The method of claim 10, further comprising selecting a number of the selected ones of the plurality of switch arrays based on output regulator criterion.

14. The method of claim 13, wherein the output regulator criterion is selected from a group consisting of output current, power switch current for at least one of the plurality of switch arrays, output inductor current, output voltage, output ripple voltage, input voltage, noise generation, and power consumption.

15. The method of claim 10, further comprising:
providing a plurality of output filters that communicate with corresponding ones of the plurality of switch arrays; and
controlling the selected ones of the plurality of switch arrays during turn-on to initialize current flowing through corresponding ones of the plurality of output filters.

16. The method of claim 11, further comprising:
operating at a switching frequency; and
setting the sampling frequency greater than the switching frequency.

17. The method of claim 10, wherein:
the drive signals include the first selected pulses and the second selected pulses;
the sampling frequency has a period; and
the method further includes dithering the drive signals to adjust at least one of the first second pulse width and the second pulse width by portions of the period.

18. The method of claim 17, further comprising:
adjusting the first pulse width by a first portion of the period; and
adjusting the second pulse width by a second portion of the period that is greater than or less than the first portion.

* * * * *